United States Patent
Brahm et al.

(10) Patent No.: US 8,992,088 B2
(45) Date of Patent: Mar. 31, 2015

(54) TILTING PAD RADIAL BEARING WITH AN ALIGNING DEVICE FOR A SINGLE-SHAFT TURBOMACHINE

(71) Applicant: Siemens Aktiengesellschaft, Munich (DE)

(72) Inventors: Bernadette Brahm, Bochum (DE); Frank Bockel, Hennef (DE); Diethelm Dettmar, Wesel (DE); Anna Christina Droschinski, Mulheim an der Ruhr (DE); Bernd Luneburg, Mulheim an der Ruhr (DE); Umit Mermertas, Mulheim an der Ruhr (DE); Jan Soggeberg, Dorsten (DE); Marcel Stranger, Mulheim an der Ruhr (DE); Andreas Winkler, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/351,253

(22) PCT Filed: Sep. 21, 2012

(86) PCT No.: PCT/EP2012/068658
§ 371 (c)(1),
(2) Date: Apr. 11, 2014

(87) PCT Pub. No.: WO2013/053853
PCT Pub. Date: Apr. 18, 2013

(65) Prior Publication Data
US 2014/0248008 A1 Sep. 4, 2014

(30) Foreign Application Priority Data
Oct. 14, 2011 (EP) .................................... 11185231

(51) Int. Cl.
*F16C 17/03* (2006.01)
*F01D 25/16* (2006.01)
*F16C 23/04* (2006.01)

(52) U.S. Cl.
CPC ................ *F01D 25/16* (2013.01); *F16C 17/03* (2013.01); *F16C 23/045* (2013.01); *F16C 2360/23* (2013.01)

USPC ........................... 384/309; 384/311; 384/312

(58) Field of Classification Search
CPC ......... F16C 17/03; F16C 25/04; F16C 32/067
USPC ................................... 384/117, 309, 311, 312
See application file for complete search history.

(56) References Cited

U.S. PATENT DOCUMENTS

| | | | |
|---|---|---|---|
| 4,039,228 A | 8/1977 | Repose et al. | |
| 4,765,759 A | 8/1988 | Le Breton et al. | |
| 5,547,287 A * | 8/1996 | Zeidan | 384/117 |
| 6,170,989 B1 | 1/2001 | Zeidan | |

FOREIGN PATENT DOCUMENTS

DE 3414910 10/1985

* cited by examiner

*Primary Examiner* — Phillip A Johnson
(74) *Attorney, Agent, or Firm* — Beusse Wolter Sanks & Maire, PA

(57) ABSTRACT

A tilting pad radial bearing for a single-shaft turbomachine is provided having a support ring, tilting pad, and tilting pad support with an aligning device rigidly fixed to the inner face of the support ring and which has a convex sliding surface facing inwards and concave sliding surface facing outwards, the concave sliding surface rigidly fixed to the outer lying rear face of the tilting pad. The sliding surfaces lay one above the other, and each surface is a circular arc in each sliding surface longitudinal section. The aligning device keeps the axial position of the tilting pad adjustable relative to the support ring such that an angle of attack of the sliding surface of the tilting pad is adjustable relative to the axis of the tilting pad radial bearing dependent on the axial position of the concave sliding surface relative to the axial position of the convex sliding surface.

14 Claims, 2 Drawing Sheets

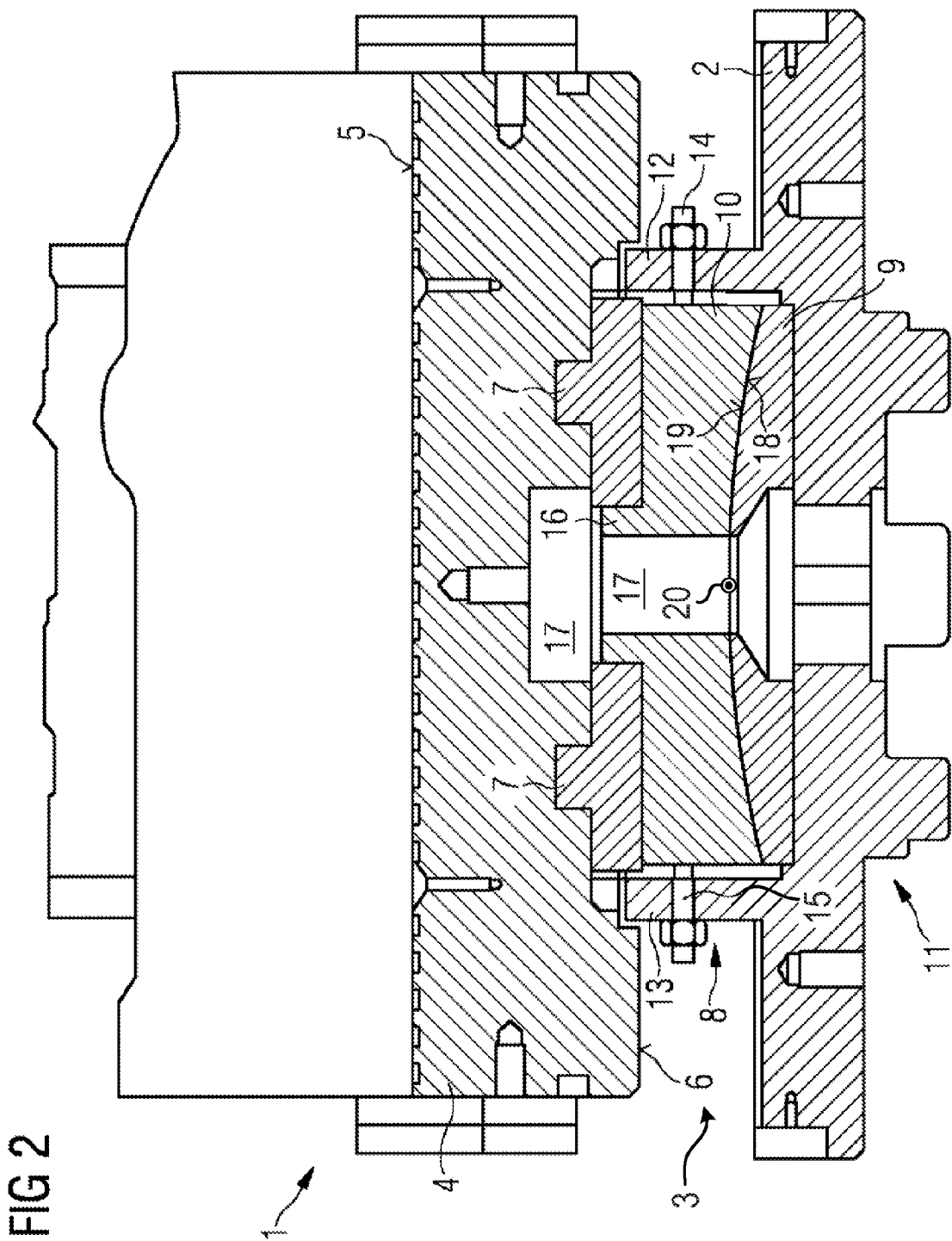

TILTING PAD RADIAL BEARING WITH AN ALIGNING DEVICE FOR A SINGLE-SHAFT TURBOMACHINE

CROSS REFERENCE TO RELATED APPLICATIONS

This application is the U.S. National Stage of International Application No. PCT/EP2012/068658 filed Sep. 21, 2012, and claims the benefit thereof. The International Application claims the benefit of European Application No. EP 11185231 filed Oct. 14, 2011. All of the applications are incorporated by reference herein in their entirety.

FIELD OF INVENTION

The invention relates to a tilting pad radial bearing with an aligning device for a single-shaft turbomachine.

BACKGROUND OF INVENTION

A turbomachine, such as, for example, a single-shaft turbomachine, has a rotor with a shaft. What may be considered for mounting the shaft is, inter alia, a tilting pad radial bearing in which the shaft can rotate about its axis. The tilting pad radial bearing generally has three or four tilting pads, a distinction being made between lower and upper tilting pads. The lower tilting pads bear the weight of the shaft, whereas the upper tilting pads prevent the shaft from lifting off in the event of a fault. The tilting pads are arranged in a support ring which is inserted into a bearing housing. The weight is dissipated via the lower tilting pads, the support ring and the bearing housing into a base. It is necessary for the operation of the machine that the shaft axis and the machine axis are superimposed.

In order to align the shaft, the outer side of the lower tilting pads is made of a soft material such that the material can deform plastically under the effect of the weight, whereby the shaft axis can automatically be matched to the machine axis. Furthermore, packings comprising thin metal sheets are provided as aligning elements between the support ring and the tilting pad allowing the two axes to be matched by a shrinking of their packings. Manual alignment of the shaft axis with the machine axis is possible only by completely dismantling the tilting pad radial bearing, which is very laborious.

SUMMARY OF INVENTION

An object of the invention is to provide a tilting pad radial bearing for a single-shaft turbomachine, wherein aligning the shaft axis with the machine axis is simple.

The tilting pad radial bearing according to aspects of the invention for a single-shaft turbomachine has a support ring, a tilting pad and a tilting pad mount having an aligning device which has an inward-facing convex sliding surface securely attached to the inside of the support ring and an outward-facing concave sliding surface securely attached to the outer tilting pad back of the tilting pad, wherein the sliding surfaces are arranged one on top of the other and are in each case arcuate in their respective longitudinal sections and the aligning device is designed to keep the tilting pad adjustable in its axial position relative to the support ring, such that depending on the axial position of the concave sliding surface relative to the axial position of the convex sliding surface it is possible to adjust an angle of inclination of the tilting pad sliding surface of the tilting pad relative to the axis of the tilting pad radial bearing. The slider is supported on the support ring base so as to be fixable in its axial position by an adjusting device.

The tilting pad radial bearing according to aspects of the invention allows advantageously simple alignment of the shaft axis with the machine axis. For the alignment, it is not necessary to completely dismantle the bearing; instead, the lower tilting pads are relieved of the weight of the shaft simply by virtue of the latter being lifted. It is further not necessary to produce the outer side of the tilting pad from a soft material and to arrange a packing comprising thin metal sheets between the support ring and the tilting pad.

The sliding surfaces are preferably cylindrical surfaces of equal radius. Moreover, the axes preferably coincide with a secant of the support ring. The aligning device preferably has a slider which is attached to the tilting pad at the tilting pad back thereof and which comprises the concave sliding surface. Furthermore, the slider is preferably engaged securely in the axial direction and form-fittingly with the tilting pad securely in the circumferential direction.

The aligning device preferably has a back part which is attached to the inside of the support ring and which comprises the convex sliding surface. Furthermore, the aligning device preferably has a support ring base with which the back part is engaged securely in the axial direction and form-fittingly. The adjusting device is preferably an adjusting screw. Moreover, the tilting pad radial bearing preferably has an oil supply duct for the tilting pad, which passes through the sliding surfaces.

BRIEF DESCRIPTION OF THE DRAWINGS

A preferred embodiment of the tilting pad radial bearing according to the invention is explained below by means of the accompanying diagrammatic drawings in which:

FIG. 2 shows a longitudinal section through one of the two lower tilting pads of the embodiment.

DETAILED DESCRIPTION OF INVENTION

Figure 1:
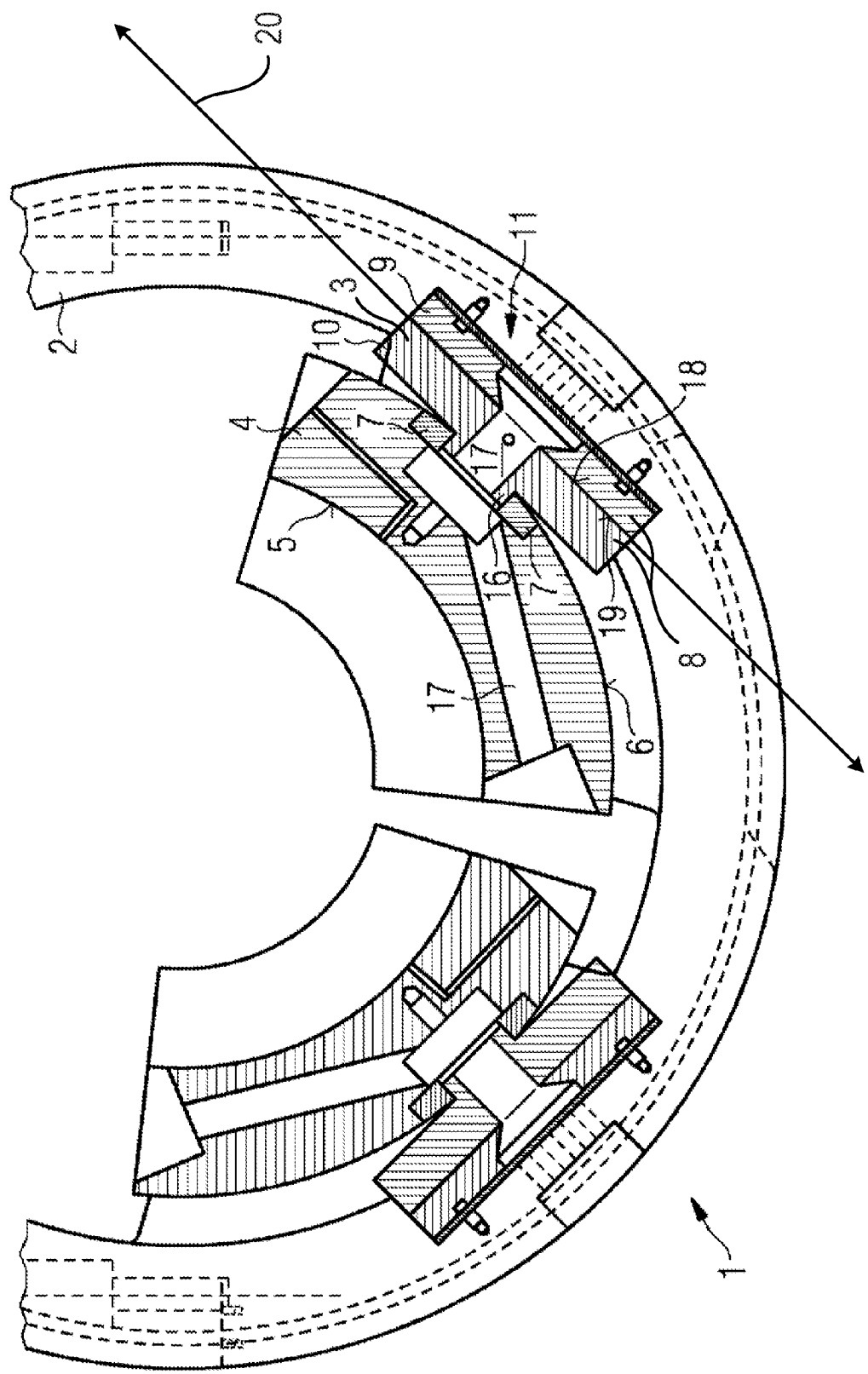
FIG. 1 shows a cross section through the lower half of the embodiment of the tilting pad radial bearing according to the invention, in which two structurally identical lower tilting pads are illustrated.

As can be seen from FIGS. 1 and 2, a tilting pad radial bearing 1 has a support ring 2, a tilting pad 4 and a tilting pad mount 3, by which the tilting pad 4 is fastened to the support ring 2. Located on the radial inside of the tilting pad 4 is the tilting pad sliding surface 5 which is a cylindrical surface, the axis of rotation of which should be parallel to the machine axis in the installed state. In the installed state, a shaft rests on the tilting pad sliding surface 5. The tilting pad 4 has, on the side facing away from the tilting pad sliding surface 5, a tilting pad back 6 which is substantially parallel to the tilting pad sliding surface 5. The shaft is arranged between the tilting pads 4 ("load between pad" configuration), wherein the tilting pad radial bearing 1 has a support angle of 45°.

As can be seen from FIGS. 1 and 2, the tilting pad mount 3 has an aligning device 8 having a back part 9 and a slider 10. The back part 9 is attached to the inside of the support ring 2 and has a radially inward-facing sliding surface 18 which is convexly curved in the axial direction. The slider 10 is arranged on the radially outward side of the tilting pad 4 and has a radially outward-facing sliding surface 19 which is concavely curved in the axial direction. The two sliding surfaces 18, 19 are cylindrical surfaces with identical radii and are arranged one on top of the other such that the axes of rotation of the convex sliding surface 18 and of the concave sliding surface 19 are superimposed and coincide with a secant 20 (shown in FIG. 2 as a normal line extending out of the plane of the cross section) of the support ring 2.

As can be seen from FIGS. 1 and 2, the slider 10 is attached to a support insert 7 at the tilting pad back 6. The slider 10 has, on that side which faces away from the concave sliding surface 19, a driver peg 16 which engages in a recess in the radially outer portion of the support insert 7. Two pegs, which engage in corresponding recesses in the tilting pad back 6, are arranged at two different axial positions on the radially inward side of the support insert 7. The radially inward surface of the support insert 7, from which the pegs project, is flat, whereas the radially outward surface of the support insert 7 is curved so as to be parallel to the tilting pad sliding surface 5. The two pegs, attached at different axial positions, of the support insert 7 prevent an axial displacement of the tilting pad 4 relative to the slider 10. In order that no plastic deformations can arise at the contact line between the tilting pad 4 and the slider 10, the support insert 7 is made of a quenched and tempered rolled steel.

As can be seen from FIGS. 1 and 2, the back part 9 is inserted into a recess created in the inside of the support ring 2. In this context, the surface facing away from the convex sliding surface 18 is flat. The back part is supported in the axial direction by a support ring base 11 which projects inwards from the support ring 2, such that the back part 9 is protected against being displaced in the axial direction.

As can be seen from FIG. 2, a first flank 12 and a second flank 13 are arranged at two different axial positions on the radially inward side of the support ring base 11. The axially outer sides of the flanks 12, 13 run flush with the axially outer sides of the support ring base, while the axially inner sides of the flanks 12, 13 are set back axially outwards such that the slider 10 can protrude past the back part 9. A first adjusting screw 14 is inserted into the first flank 12 and a second adjusting screw 15 is inserted into the second flank 13, which screws are oriented in the axial direction and allow the slider 10 to be secured variably in the axial direction.

This arrangement of the tilting pad mount 3, in particular the arrangement of the sliding surfaces 18, 19, makes it possible to move the slider 10 in the axial direction on the back part. By virtue of the fact that the tilting pad is connected securely in the axial direction to the slider 10, and that the back part 9 is connected securely in the axial direction to the support ring 2, the axis of rotation of the cylindrical tilting pad sliding surface 5 can be tilted by the axial position of the slider 10 relative to the back part 9. By virtue of the fact that the shaft rests on the tilting pad sliding surface 5, the shaft axis can be matched to the machine axis.

Furthermore, as can be seen from FIGS. 1 and 2, an oil supply duct 17 passes through the support ring 2, the back part 9, the slider 10 and the tilting pad 4, by which duct, in the installed state, a lubricating oil is introduced into the sealing gap between the tilting pad sliding surface 5 and the shaft. The oil supply duct 17 in this case passes through the center of the radially outer surface of the back part 9, perpendicular thereto, then narrows in the back part before it passes through the centers of the convex and concave sliding surfaces 18, 19, perpendicular thereto. The oil supply duct 17 is relatively broad in the region of the sliding surfaces 18, 19 such that, after the slider 10 has been displaced relative to the back part 9, the cross section of the oil supply duct 17 through which oil can flow is large enough to supply the tilting pad sliding surface 5 with oil. The oil supply duct 17 exits the slider 10 at the radially inward side of the driver peg 16, whence the duct enters the tilting pad 4. After entering the tilting pad 4, the oil supply duct 17 runs at an angle with respect to the tilting pad sliding surface 5 until the oil supply duct 17 opens, via a hole created perpendicular to the tilting pad sliding surface 5, into the sealing gap between the tilting pad sliding surface 5 and the shaft.

In order to pre-align the lower tilting pads 4, the tilting pad radial bearing 1 is set up vertically and a dummy shaft is inserted into the tilting pad radial bearing 1. The concentricity of the dummy shaft with respect to the support ring 2 is then determined and the dummy shaft is aligned centrally with respect to the support ring 2 by the aligning device 8. To that end, the adjusting screws 14, 15 are set such that the axes of rotation of the tilting pad sliding surfaces 5 are parallel to the axis of the support ring 2. If tilting of the shaft axis and the machine axis occurs during installation of the support ring 2 into the housing of the machine, this can be compensated for in the final alignment by the aligning device 8. Furthermore, in the final alignment, a lateral gap can be compensated for by lifting one tilting pad 4 and at the same time lowering the other tilting pad 4.

The invention claimed is:

1. A tilting pad radial bearing for a single-shaft turbomachine, comprising:
a support ring,
a tilting pad comprising a tilting pad sliding surface, which is an inward-facing cylindrical surface, and a tilting pad back, which is an outward-facing surface situated on a side facing away from the tilting pad sliding surface, and
a tilting pad mount having an aligning device which has an inward-facing convex sliding surface securely attached to an inside surface of the support ring, and an outward-facing concave sliding surface securely attached to the tilting pad back,
wherein:
the convex sliding surface and the concave sliding surface are cylindrical surfaces arranged to be in contact and are in each case arcuate in their respective longitudinal sections;
the aligning device is adapted to adjust an axial position of the tilting pad relative to the support ring such that, depending on an axial position of the concave sliding surface relative to an axial position of the convex sliding surface, an angle of inclination of the tilting pad sliding surface is adjustable relative to an axis of the tilting pad radial bearing; and
the aligning device comprises an adjusting device adapted to control the angle of inclination by fixing an axial position of a slider comprising the concave sliding surface.

2. The tilting pad radial bearing as claimed in claim 1, wherein the convex sliding surface and the concave sliding surface are cylindrical surfaces of equal radius.

3. The tilting pad radial bearing as claimed in claim 2, wherein axes of rotation of the convex sliding surface and the concave sliding surface coincide with a secant of the support ring.

4. The tilting pad radial bearing as claimed in claim 1, wherein the slider is attached to the tilting pad back.

5. The tilting pad radial bearing as claimed in claim 4, wherein the slider is engaged securely in an axial direction and form-fittingly with the tilting pad securely in a circumferential direction.

6. The tilting pad radial bearing as claimed in claim 1, wherein the aligning device has a back part which is attached to the inside surface of the support ring, said back art comprising the convex sliding surface.

7. The tilting pad radial bearing as claimed in claim 6, wherein the aligning device has a support ring base with which the back part is engaged securely in an axial direction and form-fittingly.

8. The tilting pad radial bearing of claim 6, further comprising:
an oil supply duct which passes through the support ring, the back part, the slider and the tilting pad,
wherein, after entering the tilting pad, the oil supply duct runs at an angle with respect to the tilting pad sliding surface until the oil supply duct opens through a hole situated perpendicular to the tilting pad sliding surface.

9. The tilting pad radial bearing as claimed in claim 1, wherein the adjusting device is an adjusting screw.

10. The tilting pad radial bearing as claimed in claim 1, wherein the tilting pad radial bearing has an oil supply duct which passes through the convex sliding surface and the concave sliding surface.

11. The tilting pad radial bearing of claim 1, wherein:
the slider is attached to the tilting pad back through a support insert; and
the slider comprises, on a side facing away from the concave sliding surface, a driver peg that engages in a recess situated on a radially outer surface of the support insert.

12. The tilting pad radial bearing of claim 11, wherein the support insert comprises:
a radially inward surface facing the tilting pad back, said radially inward surface being a flat surface; and
the radially outer surface which is a curved surface so as to be parallel to the tilting pad sliding surface.

13. The tilting pad radial bearing of claim 12, wherein the support insert further comprises two pegs which engage in corresponding recesses in the tilting pad back.

14. The tilting pad radial bearing of claim 11, wherein the support insert is made of a quenched and tempered rolled steel.

* * * * *